(12) United States Patent
Bhowmik et al.

(10) Patent No.: US 7,586,560 B2
(45) Date of Patent: Sep. 8, 2009

(54) DISPLAY USING LIGHT GUIDE AND REFRACTIVE INDEX CONTROL

(75) Inventors: Achintya K. Bhowmik, Milpitas, CA (US); Ralph M. Mesmer, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 752 days.

(21) Appl. No.: 11/028,406

(22) Filed: Jan. 3, 2005

(65) Prior Publication Data

US 2006/0146004 A1 Jul. 6, 2006

(51) Int. Cl.
*G02F 1/1335* (2006.01)
(52) U.S. Cl. .................................... 349/65
(58) Field of Classification Search .......... None
See application file for complete search history.

(56) References Cited

U.S. PATENT DOCUMENTS 6,181,367 B1   1/2001   McGrew et al.

2002/0140879 A1 * 10/2002 Fujieda ................... 349/69
2005/0018105 A1 *  1/2005 Inoue et al. .............. 349/93

FOREIGN PATENT DOCUMENTS

JP          11 249580 A        9/1999

OTHER PUBLICATIONS

"PCT International Search Report of the International Searching Authority", mailed May 16, 2006, for PCT/US2006/000137, 5 pgs.

* cited by examiner

*Primary Examiner*—Richard H Kim
(74) *Attorney, Agent, or Firm*—Buckley, Maschoff & Talwalkar LLC

(57) ABSTRACT

Some embodiments provide a device including a first material associated with a controllable refractive index, a second material associated with a first refractive index, and a third material disposed between the first material and the second material, the third material being substantially transparent to a plurality of visible light wavelengths and being associated with a second refractive index greater than the first refractive index. Devices according to some embodiments may be employed as a display in a laptop computer, a desktop computer, a personal digital assistant, a minicomputer, a projection television, a front projector, etc.

19 Claims, 10 Drawing Sheets

DISPLAY USING LIGHT GUIDE AND REFRACTIVE INDEX CONTROL

BACKGROUND

Various types of display devices are currently available for use in conjunction with electronic devices. Each display device provides a different combination of size, power consumption, operational efficiency, resolution, and external control requirements. A Liquid Crystal on Silicon (LCoS) microdisplay, for example, includes a two-dimensional array of pixel cells formed on a semiconductor substrate. Successive layers of a typical LCoS pixel cell include a transistor, a reflective material, a first transparent electrode, liquid crystal material, and a second transparent electrode. To transmit light (i.e., ON state), the electrodes of a pixel cell may control a state of the liquid crystal material in order to allow incident light with appropriate polarization to pass through the liquid crystal material, reflect off of the reflective material, and pass back through the liquid crystal material. Alternatively, in the OFF state, the electrodes may control the state of the liquid crystal material to alter the light polarization such that the incident light is prevented from passing though the liquid crystal material to the reflective material.

DETAILED DESCRIPTION

Figure 1:
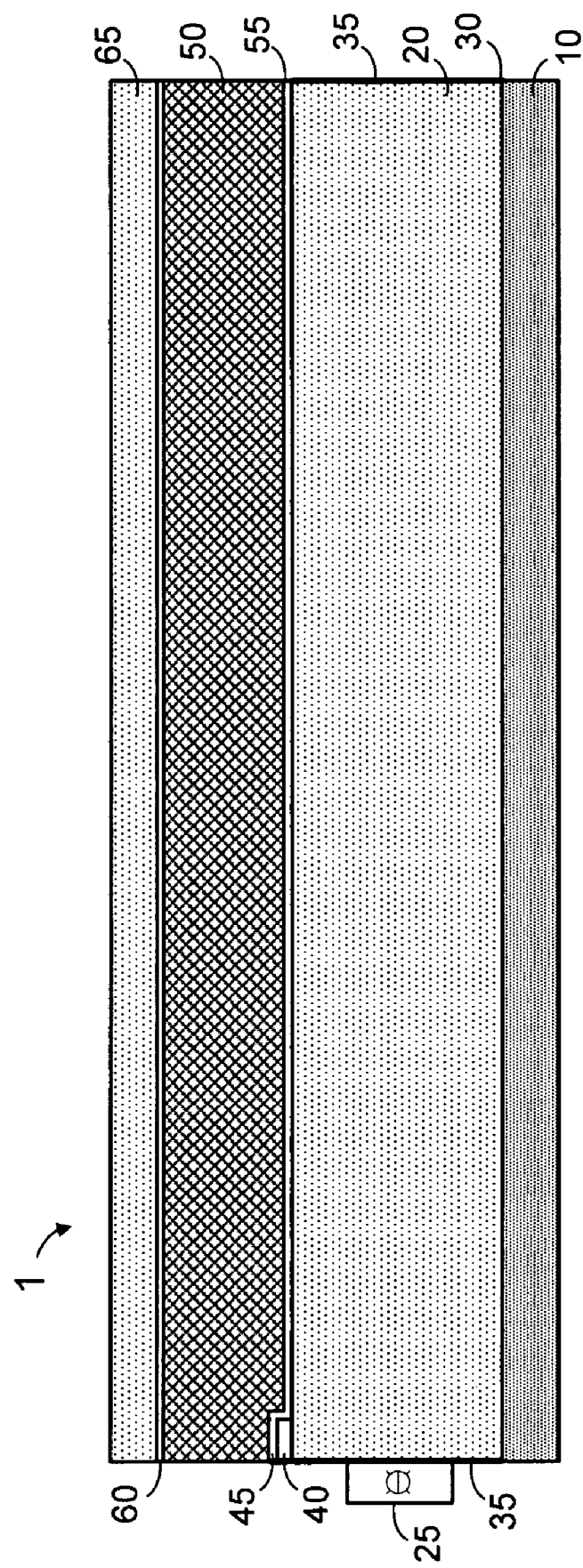
FIG. 1 is a side cross-sectional view of a device according to some embodiments.

FIG. 1 is a schematic side cross-sectional view of a portion of device 1 according to some embodiments. Device 1 may selectively emit light as will be described below. In some embodiments, device 1 is a single pixel cell of a display device. Such a display device may comprise an array of thousands of pixel cells.

Device 1 includes material 10, which is associated with a first refractive index ($n_1$) and material 20, which is associated with a second refractive index ($n_2$). Material 20 may be substantially transparent to several visible light wavelengths. In addition, the second refractive index may be greater than the first refractive index. Material 10 and material 20 may comprise any currently- or hereafter-known suitable materials.

Material 10 is coupled to material 20. According to some embodiments, material 10 and material 20 are selected based at least in part on an ease with which the materials may be coupled. Other manufacturing considerations may be considered in the selection of material 10 and material 20, including but not limited to temperatures, pressures, vibrations and handling options.

According to some embodiments, material 10 comprises a polymer and material 20 comprises glass. Material 20, however, may comprise any material associated with a suitable refractive index and providing at least a desired degree of transparency to desired light wavelengths. Some examples of polymers for use as material 10 include polystyrene and PMMA. In some embodiments, material 10 exhibits low absorption of the desired light wavelengths.

Light source 25 outputs light of desired visible wavelengths into material 20. Light source 25 may comprise a light-emitting diode or any other suitable light source. According to some embodiments, light source 25 is configured to separately output red light, green light and blue light. The light may be output at an angle that results in substantially total internal reflection of the light at interface 30 between material 10 and material 20.

More specifically, light traveling in material 20 that is incident at interface 30 at any angle larger than a critical angle will be reflected back into the material 20. According to some embodiments, the critical angle is given by:

$$\text{critical angle} = \sin^{-1}(n_1/n_2).$$

Accordingly, light source 25 may output light into material 20 at an angle that is larger than the critical angle in accordance with some embodiments.

Reflective material 35 may be disposed around a perimeter of material 20 to prevent light from exiting material 20 at the perimeter. The reflective material may be metallic material, dielectric material, or any other suitable material that is or becomes known.

Transistor 40 is disposed on material 20. Transistor 40 may be used to control a voltage applied to elements of device 1. As will be described below, the voltage may determine whether or not device 1 emits light that is output by light source 25. Some embodiments for fabricating transistor 40 will also be described below.

Electrode 45 is disposed above transistor 40 and material 20. Electrode 45 may comprise any conductive material that is sufficiently transparent to some or all of the light wavelengths output by light source 25. According to some embodiments, electrode 45 comprises Indium-Tin-Oxide. Other embodiments of electrode 45 may comprise carbon nanotubes.

Material 50 comprises any suitable material having a controllable refractive index ($n_c$). According to some embodiments, $n_c$ may be controlled by applying an electric field to material 50. Material 50 may comprise liquid crystal material sandwiched by suitable alignment layers, poled polymer material, single-crystal thin-film material, and/or any other suitable material that is or becomes known.

According to some embodiments, $n_c$ may be controlled to be less than $n_2$. Consequently, the light output by light source 25 may be substantially totally reflected at interface 55 between material 20 and material 50 if its angle of incidence is greater than $\sin^{-1}(n_c/n_2)$. $n_c$ may also be controlled to be greater than $n_2$, in which case the light passes through interface 55 regardless of its angle of incidence.

Electrode 60 is disposed above material 50. Electrode 60 may comprise any conductive material that is sufficiently transparent to some or all of the light wavelengths output by light source 25. An electric field across material 50 is determined by a potential difference between electrode 60 and electrode 45. The electric field may control $n_c$, therefore $n_c$ may be controlled by controlling the relative voltages of electrodes 45 and 60.

Material 65 may comprise any material to suitably transmit some or all of the light wavelengths output by light source 25. Material 65 may comprise glass and may also serve to protect device 1 from environmental factors.

Figure 2:
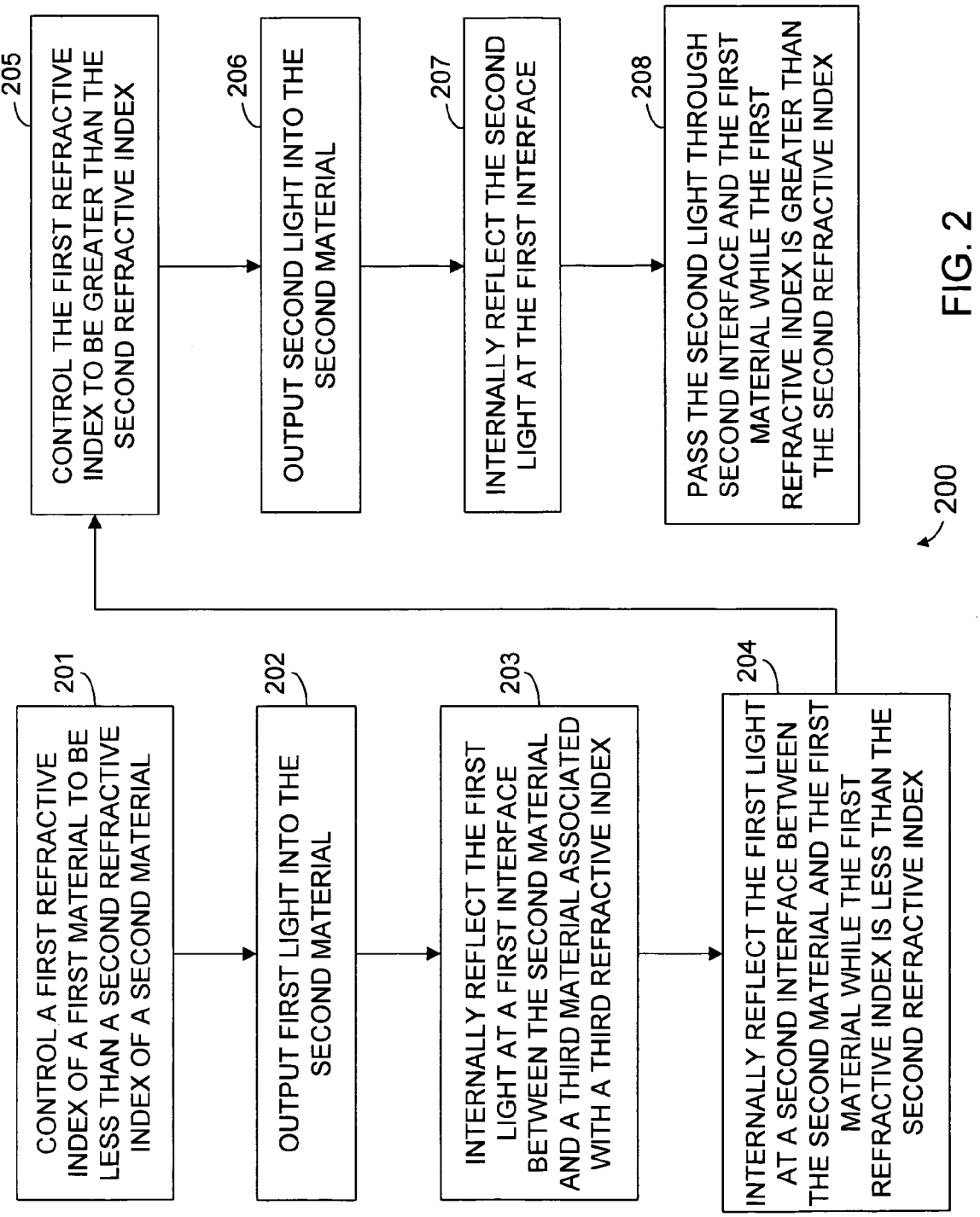
FIG. 2 is a flow diagram of a process according to some embodiments.

FIG. 2 shows a diagram of process 200 according to some embodiments. Process 200 may be performed by a device such as, but not limited to, device 1 of FIG. 1. Process 200 may be performed in conjunction with any combination of hardware, software, and/or firmware. For example, a device may perform process 200 in response to control signals received from an external system. The external system may comprise a microprocessor executing program code.

Initially, at 201, a first refractive index of a first material is controlled to be less than a second refractive index of a second material. In some embodiments of 201, the first refractive index is controlled by applying an electric field to the first material. As an example of these embodiments, electrodes 45 and 60 of device 1 are controlled to establish little or no potential difference therebetween.

For example, electrode 60 may be coupled to ground and electrode 45 may be coupled to transistor 40. Transistor 40 may also be coupled to a control signal line and an electrode voltage signal line. A control signal on the control signal line may control transistor to selectively couple electrode 45 to the electrode voltage signal line. In the present example, electrode 45 is not coupled to the electrode voltage signal line at 201, and therefore little or no electric field is applied across material 50. As a result, $n_c$ is less than $n_2$.

According to some embodiments, $n_c$ is greater than $n_2$ when material 50 is an "uncontrolled" state, and $n_c$ is becomes less than $n_2$ when material 50 is "controlled". For example, $n_c$ may be greater than $n_2$ when little or no electric field is applied across material 50, and $n_c$ may become less than $n_2$ when an electric field is applied across material 50.

Light is output into the second material at 202. Continuing with the present example, light source 25 may output light into material 20 at 202. The light may comprise any visible light wavelengths. In some embodiments, the light substantially comprises the wavelengths of a primary additive color (i.e., red, green or blue).

Figure 3A:
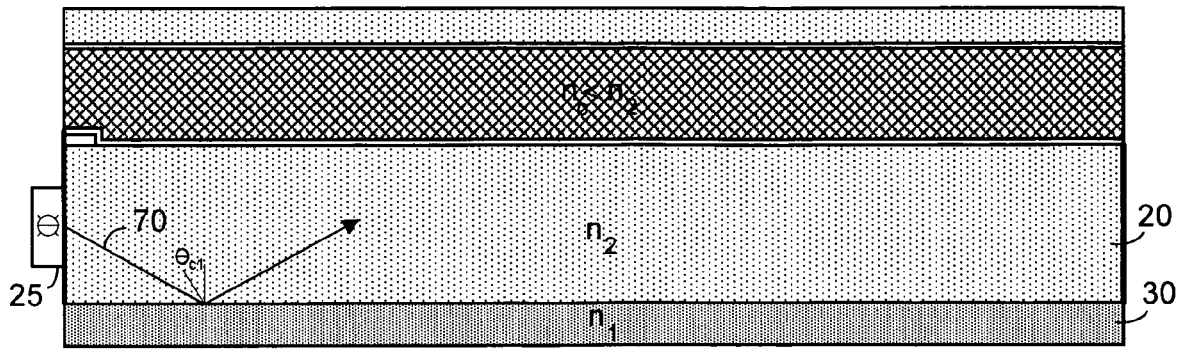
FIG. 3A is a side cross-sectional view of a device to illustrate total internal reflection at a first interface according to some embodiments.

The output light is internally reflected at 203 at an interface between the second material and a third material. The third material is associated with a refractive index that is less than the refractive index of the second material. FIG. 3A illustrates 203 according to some embodiments. As shown, light 70 is reflected at interface 30 between material 20 and material 10, where $n_1 < n_2$. Also shown is critical angle $\theta_{c1} = \sin^{-1}(n_1/n_2)$. Light 70 is output by light source 25 at 202 to ensure that the angle at which light 70 intercepts interface 30 is greater than $\theta_{c1}$.

Figure 3B:
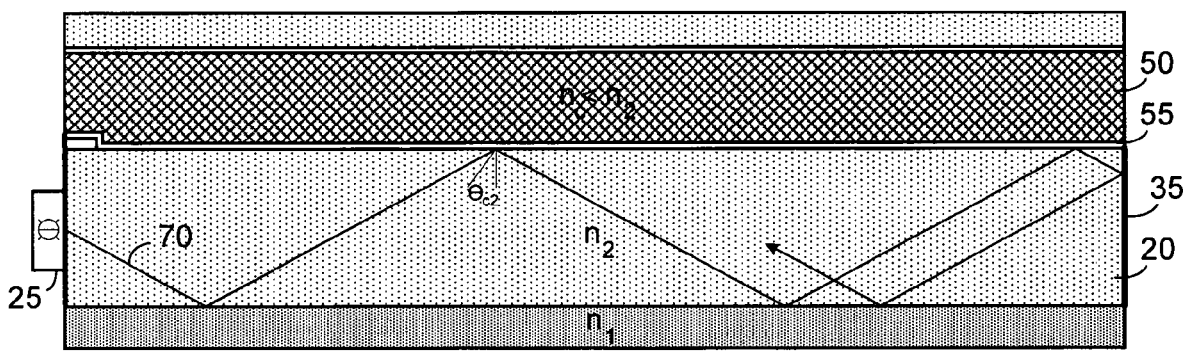
FIG. 3B is a side cross-sectional view of a device to illustrate total internal reflection at a second interface according to some embodiments.

Next, at 204, the light is internally reflected at a second interface between the second material and the first material. The light is internally reflected while the first refractive index of the first material is less than the second refractive index of the second material. FIG. 3B illustrates 204 with respect to the present operational example of device 1. After reflecting at interface 20, light 70 travels through material 20 and reflects internally at interface 55. The angle of incidence of light 70 at interface 55 is greater than the illustrated critical angle $\theta_{c2} = \sin^{-1}(n_c/n_2)$, where $n_c < n_2$. FIG. 3B also illustrates subsequent internal reflections of light 70 at interface 30, interface 55 and reflective material 35.

The first refractive index is then controlled at 205 to be nearly equal to or greater than the second refractive index. Transistor 40 may couple electrode 45 to an electrode voltage signal at 205 in response to a control signal. Such coupling may generate an electric field across material 50, which in turn increases the refractive index $n_c$ to a value nearly equal to greater than $n_2$. As mentioned above, materials and methods other than those described herein may be used to increase a refractive index according to some embodiments.

Light is output into the second material at 206. Light source 25 may output light at 206 having wavelengths similar to or different from the light output at 202. In some embodiments, the light output at 202 is primarily composed of wavelengths of a first primary color, and the light output at 206 is primarily composed of wavelengths of a second primary color. A light source different from light source 25 may output the second light at 206. An angle at which the second light is output may be different from an angle at which the first light was output at 202.

Figure 3C:
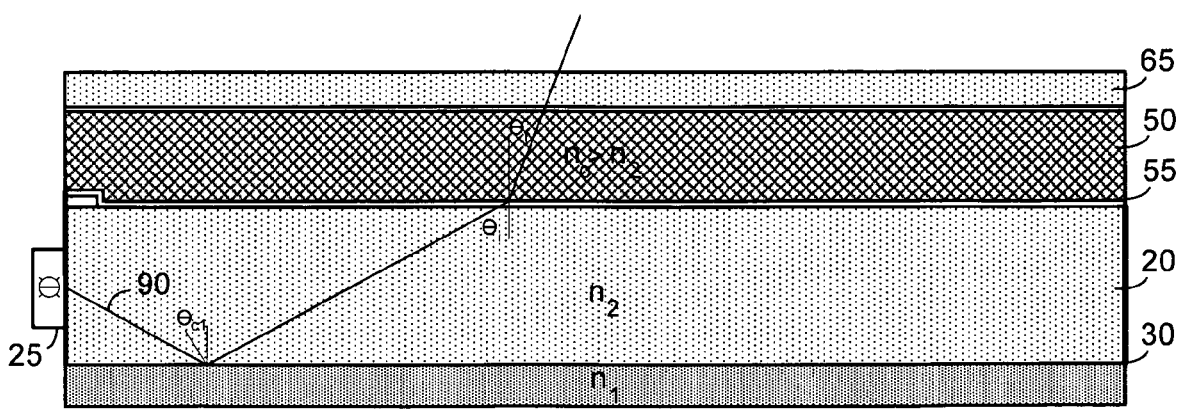
FIG. 3C is a side cross-sectional view of a device to illustrate light passing through a second interface according to some embodiments.

The second light is internally reflected at the first interface at 207, and, at 208, is passed through the second interface and the first material while the first refractive index is greater than the second refractive index. FIG. 3C illustrates 207 and 208 according to some embodiments. Second light 90 intercepts interface 30 at an angle greater than $\theta_{c1}$, which remains unchanged from 203. Second light 90 is then not completely reflected at interface 55 because $n_c > n_2$, and hence is transmitted substantially through the interface 55. $\sin^{-1}(n_c/n_2)$ cannot be evaluated in a case that $n_c > n_2$, so no critical angle exists that will result in total internal reflection.

Second light 90 is therefore refracted at 55 subject to the equation:

$$\theta_r = \sin^{-1}[(n_2/n_c)\sin\theta_i].$$

Second light 90 then passes through material 50, material 65, and outside of device 1. Material 50 and/or material 65 may apply desirable or undesirable filtering and/or attenuation to second light 90 as it passes therethrough.

Figure 4:
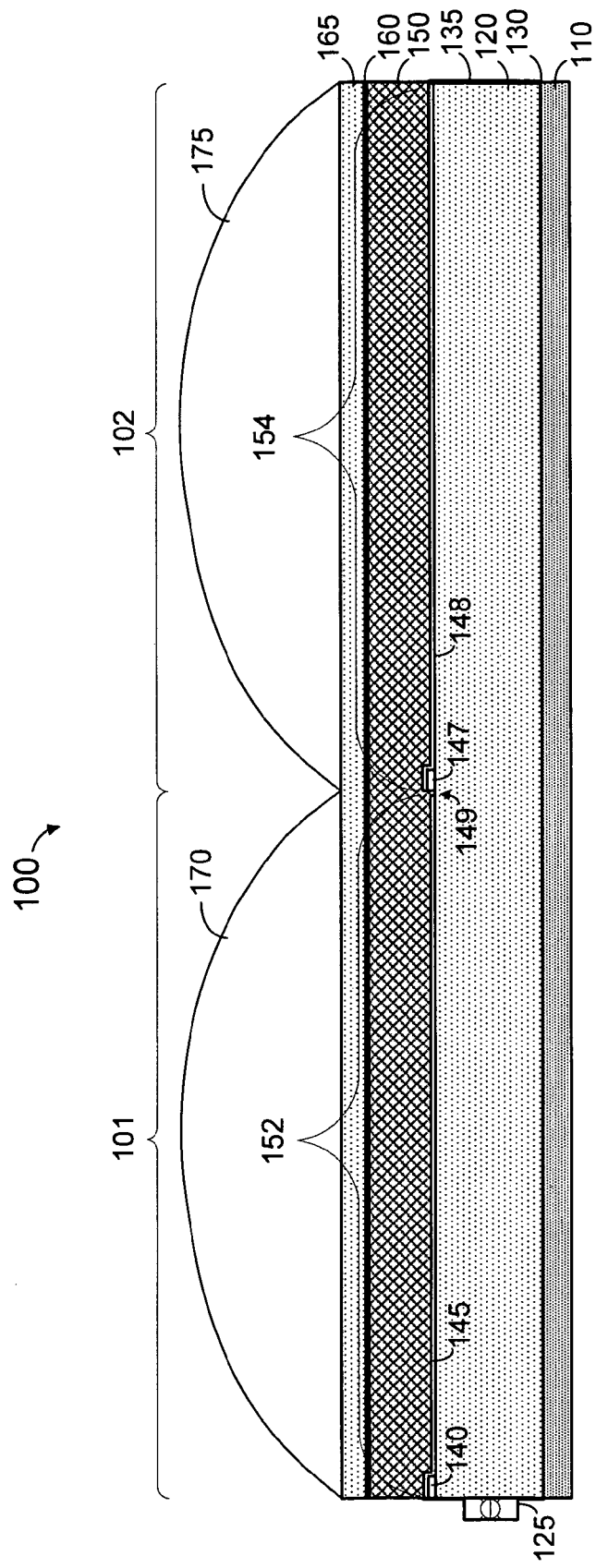
FIG. 4 is a side cross-sectional view of a device according to some embodiments.

FIG. 4 is a cross-sectional side view of device 100 according to some embodiments. Device 100 includes two pixels cells 101 and 102 that may be used to display two pixels of an image. Elements 110, 120, 125, 130, 135, 14, 145, 150, 160, and 165 may be implemented as described above with respect to similarly-numbered elements of device 1.

Device 100 includes transistor 147 and electrode 148. Transistor 147 may be constructed similarly to transistor 40 and transistor 145 and may be coupled to electrode 148 to control a voltage thereof. Electrode 148 is electrically isolated from electrode 145 by virtue of gap 149. Device 100 may therefore operate to establish one voltage on electrode 148 and a different voltage on electrode 145. As a result, an electric field across first portion 150 of material 150 may be controlled independently from an electric field across second portion 154 of material 150. Consequently, light output by light source 125 may be emitted by neither, both, or either one of pixel cells 101 and 102.

Pixel cells 101 and 102 may also include a respective one of microlenses 170 and 175. Microlenses 170 and 175 may focus or otherwise process light emitted by pixel cells 101 and 102.

According to some embodiments, a single electrode is associated with both pixel cells 102 and 102 between material 120 and material 150. Electrode 160 may be divided into two or more electrically isolated electrodes associated with either pixel cell 101 or pixel cell 200.

Pixel cells 101 and 102 may be members of a two-dimensional array of equally-spaced pixel cells. In some embodiments, the array may include thousands of pixel cells on a side. Each pixel cell of the array may correspond to a single image pixel of a display device.

Figure 5:
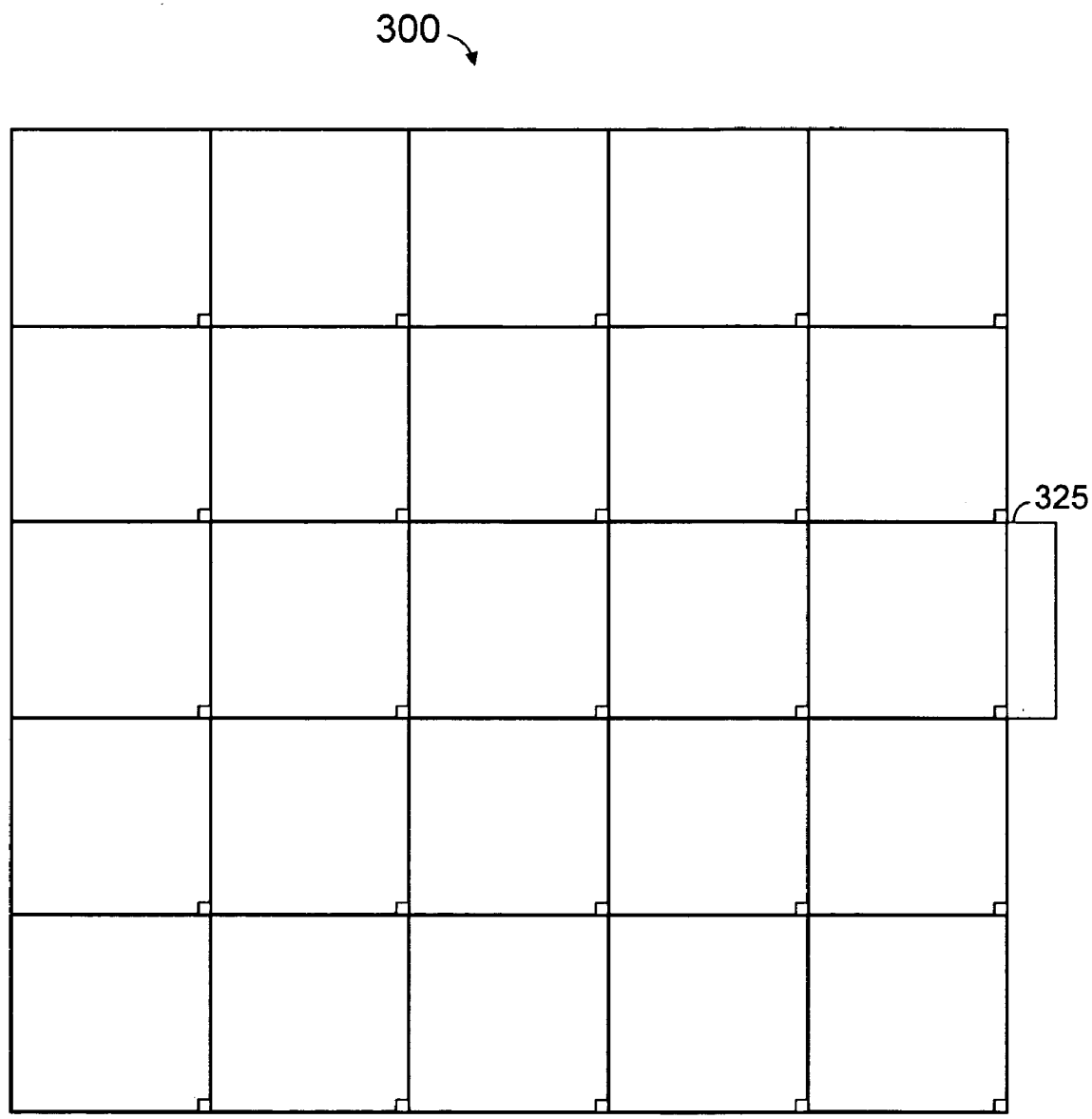
FIG. 5 is a representational top view of an array of display pixels according to some embodiments.

FIG. 5 is a top view of array 300 of pixel cells according to some embodiments. Array 300 includes twenty-five pixel cells in this example, with each cell including a transistor. Each transistor may be electrically coupled to a respective control signal to control a voltage of an electrode of its pixel cell. The control signals may thereby independently control a refractive index of material associated with each pixel cell.

Also shown in FIG. 5 is light source 325. Light source 325 may be coupled to array 300 so as to output light into each pixel cell as illustrated in FIGS. 3A through 3C. Light source 325 may comprise several independent light sources. In some embodiments, several light sources are disposed around the perimeter of array 300.

Although each pixel cell of array 300 includes a dedicated transistor, embodiments are not limited thereto. Some embodiments may include multiple transistors for every pixel due to a particular driving scheme to be used. In some embodiments, a passive addressable circuit is employed in which the electrodes of each pixel cell are coupled in rows and columns. Accordingly, an electric field across a controllable layer of a pixel cell may be controlled by applying appropriate signals to the row and column to which the pixel cell belongs.

Figure 6:
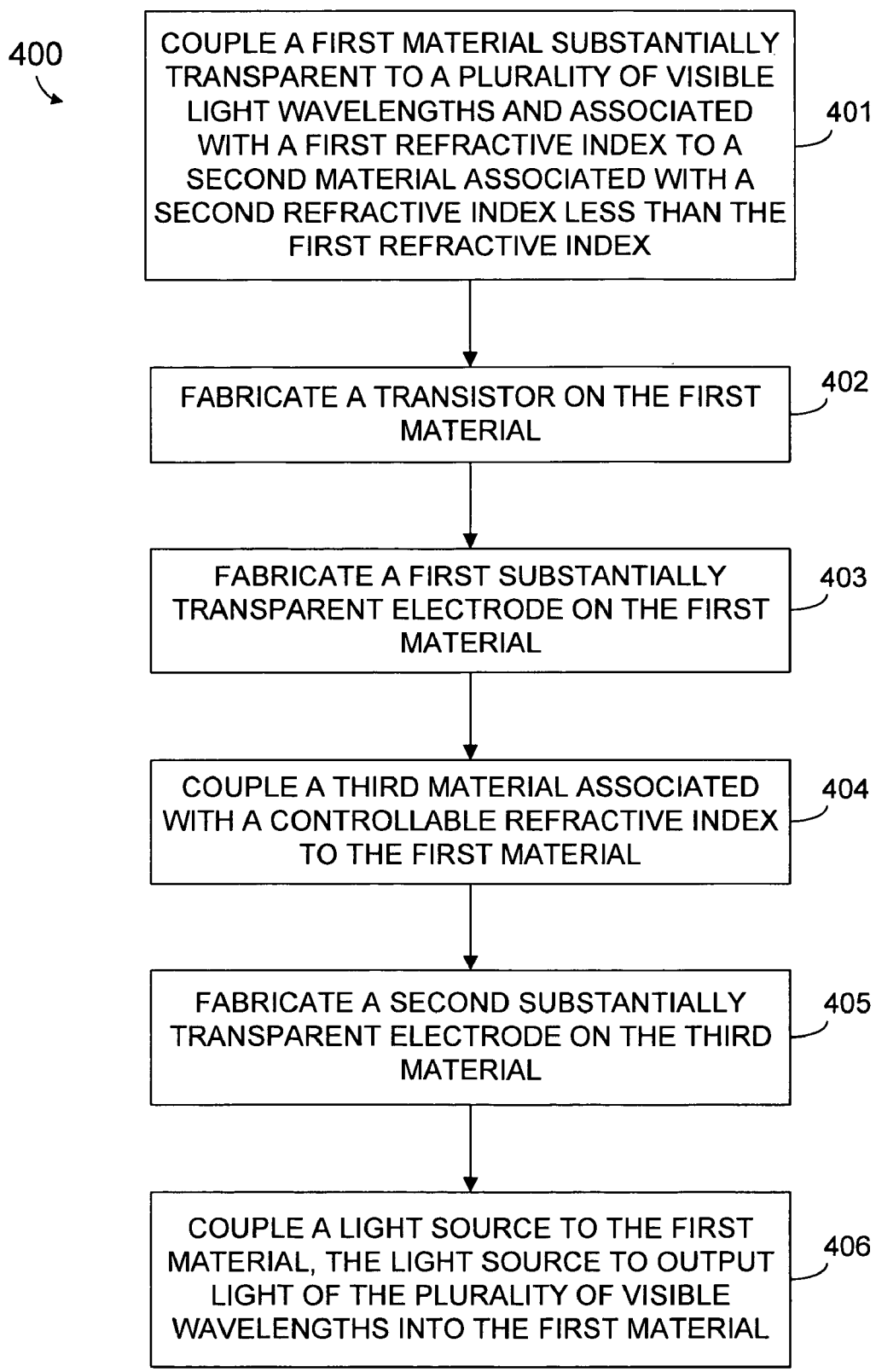
FIG. 6 is a flow diagram of a process according to some embodiments.

FIG. 6 is a diagram of process 400 to fabricate a device according to some embodiments. Process 400 may be performed in conjunction with any combination of hardware, software, and/or firmware. For example, several fabrication systems may be used to perform process 200, some of which may be located remote from one another and/or which may be owned and/or operated by different entities.

Initially, at 401, a first material is coupled to a second material. The first material is substantially transparent to a plurality of visible light wavelengths and associated with a first refractive index. The second material is associated with a second refractive index that is less than the first refractive index.

Figure 7A:
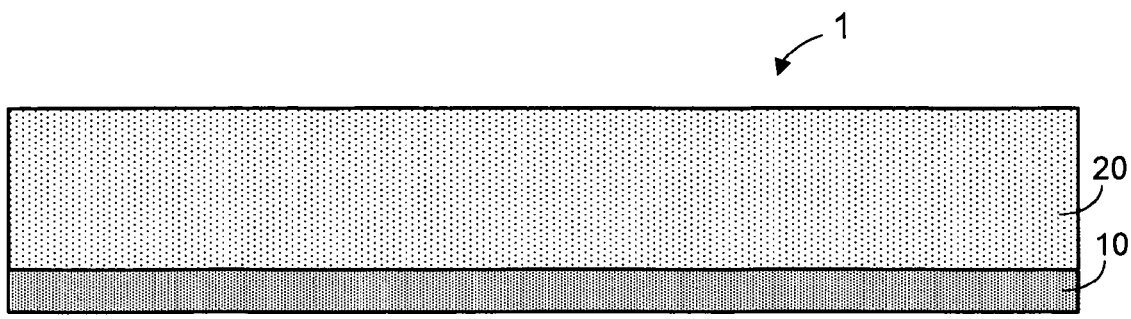
FIGS. 7A through 7E comprise side cross-sectional views of a device during fabrication according to some embodiments.

FIG. 7A is a side cross-sectional view of device 1 after 401 according to some embodiments. Material 20 has been coupled to material 10. A refractive index associated with material 10 is less than a refractive index associated with material 20. Material 10 may be coupled to material 20 by spinning, sputtering, laminating, or any other technique that is or becomes known.

Figure 7B:
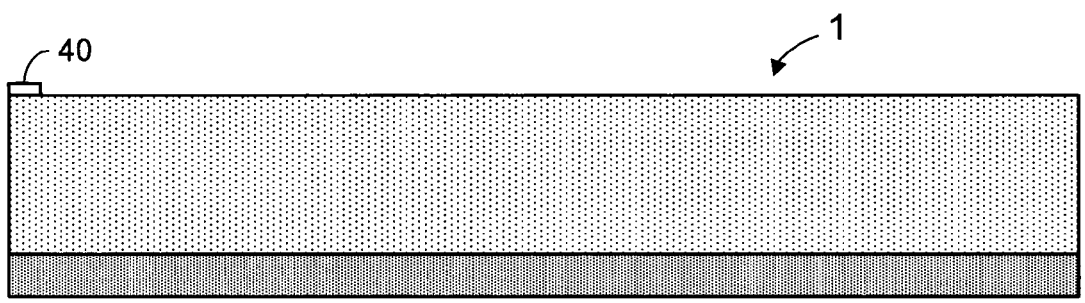

A transistor is fabricated on the first material at 402. The transistor may be fabricated by growing crystalline silicon on material 20 and by using conventional photolithographic and etching techniques to fabricate the transistor within the silicon. Portions of the silicon that do not include the transistor may be etched away to expose as much of material 20 as possible. FIG. 7B illustrates device 1 after fabrication of transistor 40.

Figure 7C:
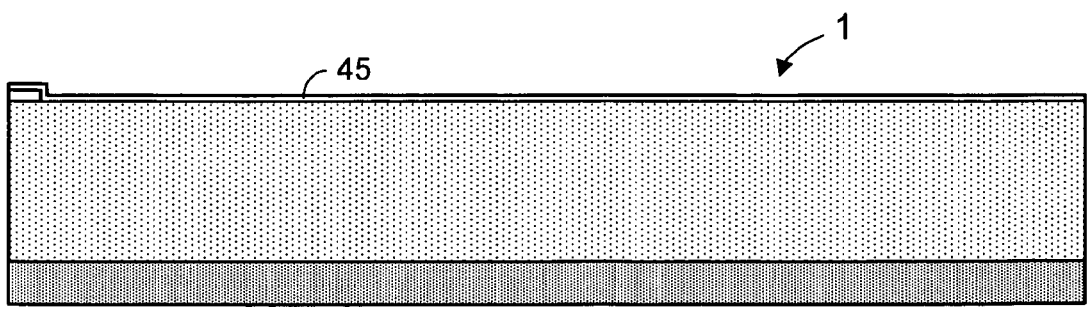

Next, at 403, a first substantially transparent electrode is fabricated on the first material. The electrode may be fabricated such that it becomes electrically coupled to the transistor fabricated at 402. The electrode may be fabricated using any technique. FIG. 7C illustrates device 1 after deposition of electrode 45 at 403. According to some embodiments such as those illustrated in FIGS. 4 and 5, the first electrode may be separated into electrically isolated electrodes that are dedicated to respective pixel cells. This separation may include etching of the first electrode.

Figure 7D:
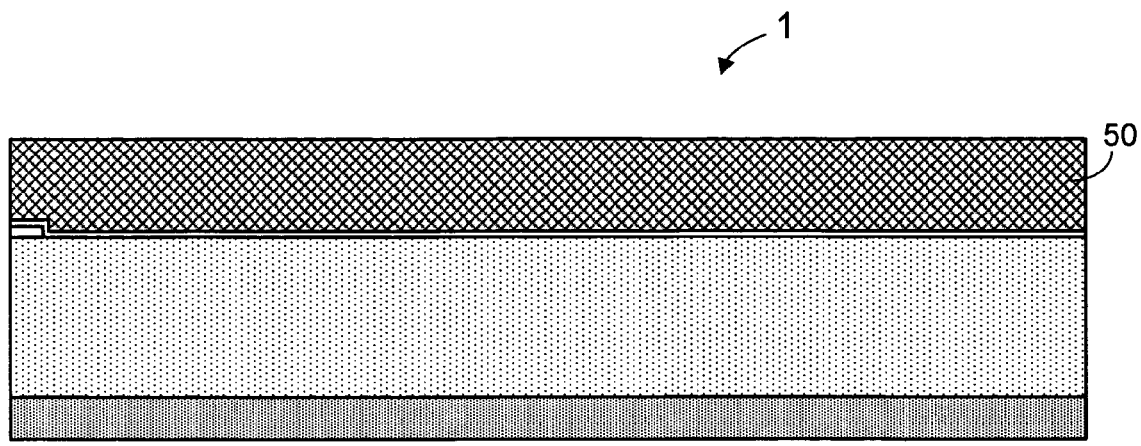

A third material is coupled to the first material at 404. The third material is associated with a controllable refractive index. The refractive index may be controlled using the methods described herein or by any other method. The third material may be deposited using any suitable system, and an example of device 1 after 404 is shown in FIG. 7D.

Figure 7E:
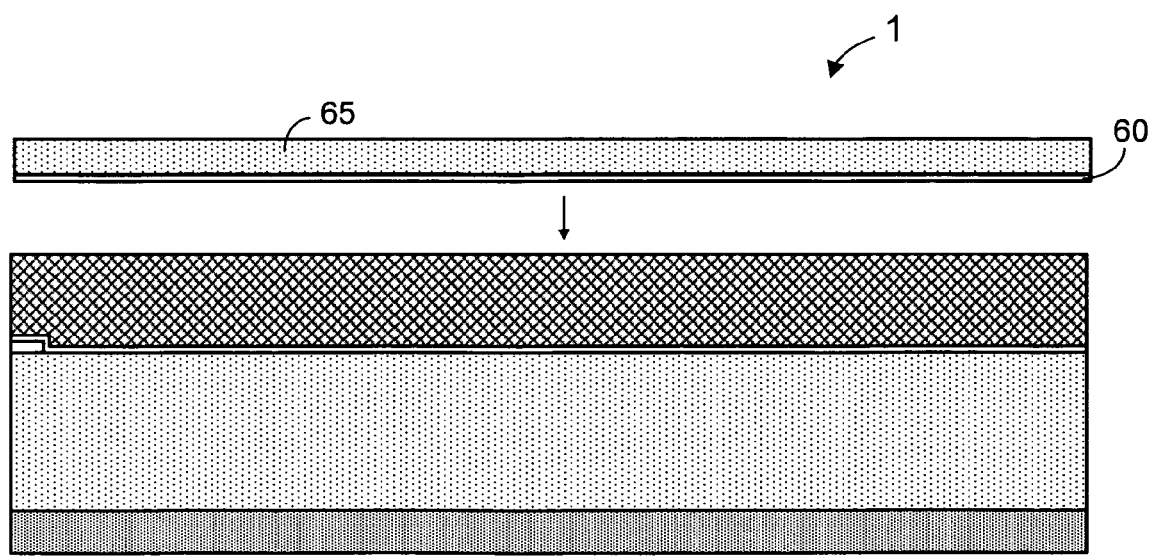

At 405, a second substantially transparent electrode is fabricated on the third material. Some embodiments of 405 include depositing the second electrode on a substantially glass substrate (e.g., glass), and then, as shown in FIG. 7E, coupling the combined glass and electrode unit to the third material.

A light source is coupled to the first material at 406. The light source is to output light into the first material. The light may comprise visible wavelengths to which the first material is substantially transparent. FIG. 1 illustrates device 1 after completion of 406 according to some embodiments.

As mentioned above, some embodiments may further include depositing a microlens on each fabricated pixel cell. Additionally or alternatively, reflective material may be coupled to an exposed perimeter of the first material to prevent light from escaping therefrom.

Figure 8A:
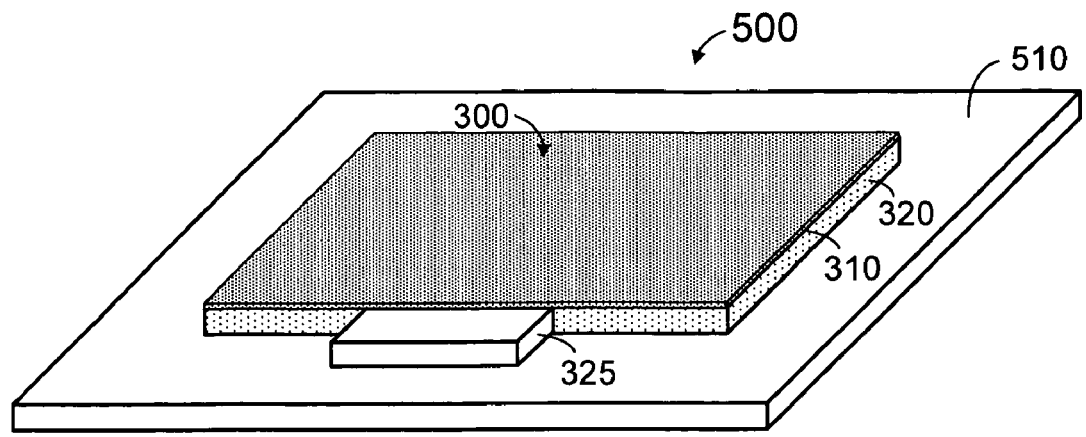
FIG. 8A is a perspective view of the underside of a display device according to some embodiments.

FIG. 8A is a perspective view of the underside of display 500 according to some embodiments. Display 500 includes array 300 mounted within substrate 510. Each pixel cell in array 300 includes a portion of monolithic material 310 having a first refractive index and a portion of monolithic material 320 having a second refractive index that is greater than the first refractive index. Material 320 is substantially transparent to wavelengths of light emitted by light source 325.

Figure 8B:
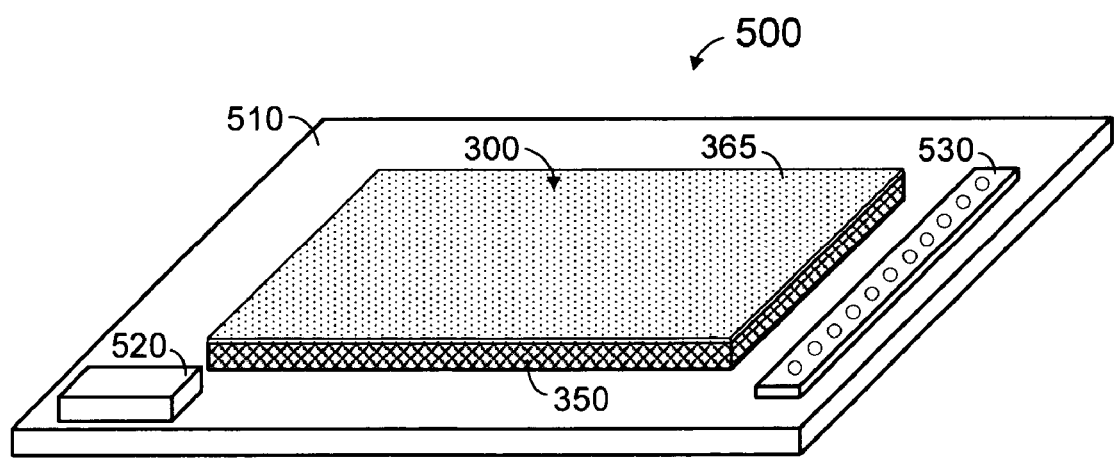
FIG. 8B is a perspective view of the underside of a display device according to some embodiments.

FIG. 8B is a perspective view of the top of display 500. Each pixel cell of array 300 includes a portion of material 350 having a controllable refractive index and material 365, which is substantially transparent to some or all of the light wavelengths output by light source 325. Control circuit 520 and connector 530 are coupled to substrate 520 to provide control of array 300 according to some embodiments.

For example, connector 530 may receive display signals from a graphics controller or other device. Control circuit 520 may receive the control signals from connector 530 via signal traces embedded within substrate 510. Control circuit 520 may then transmit control signals to array 300 to produce images in accordance with the display signals. The control signals may instruct each pixel cell of array 300 either to emit light output by light source 325 (i.e., control $n_c$ to be greater than $n_2$) or to not emit the light (i.e., control $n_c$ to be less than $n_2$).

According to some embodiments, display 500 provides field-sequential color by sequentially emitting red, green and blue light from light source 325. For each color of light, a pixel cell of array 300 is controlled to emit light based on whether the color is present in the image pixel to which the pixel cell corresponds. A sufficient field rate may result in a visually-continuous full-color display.

Figure 9:
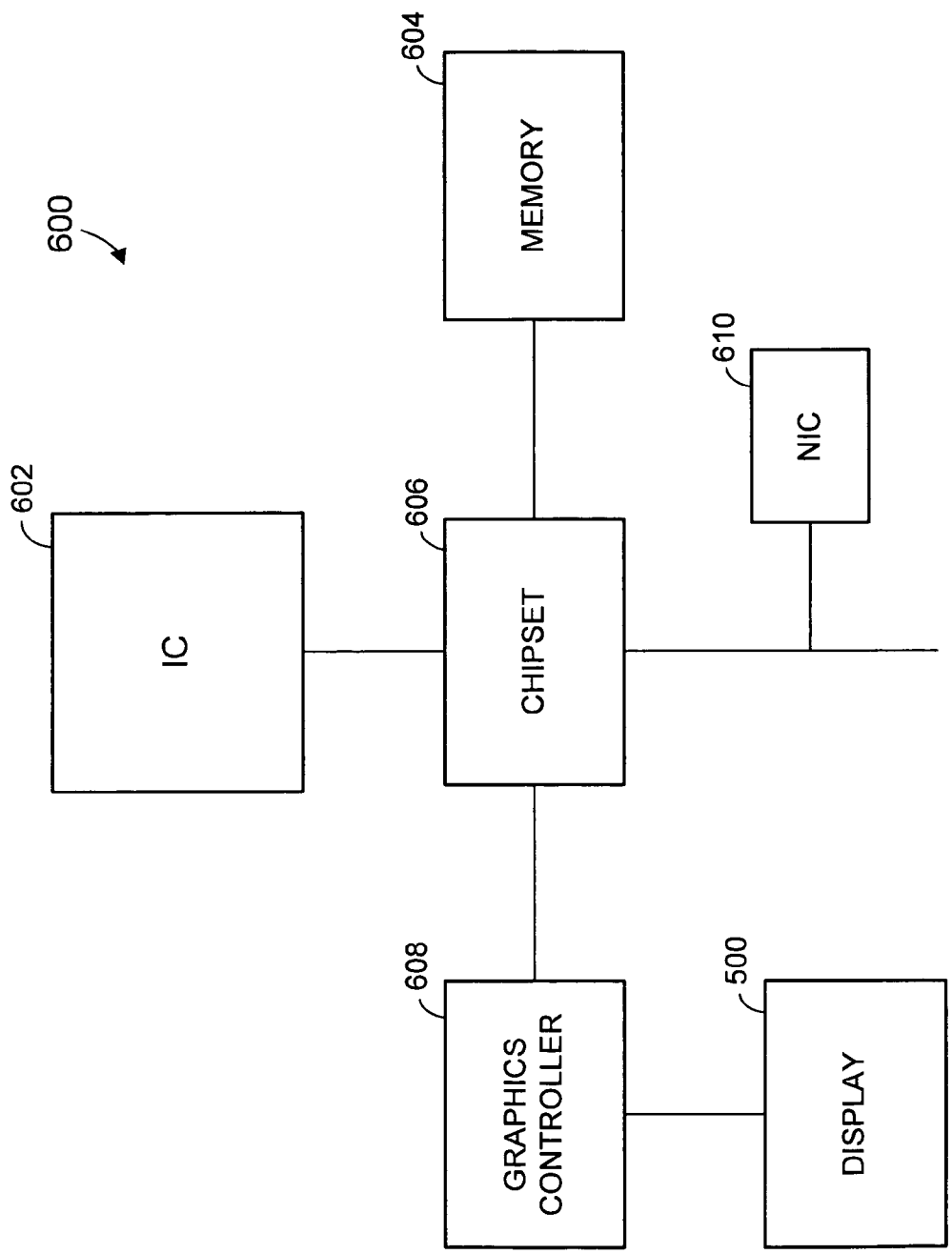
FIG. 9 is a block diagram of a system according to some embodiments.

FIG. 9 illustrates a block diagram of system 600 according to some embodiments. System 600 may comprise any system using a display, including but not limited to a laptop computer, a desktop computer, a personal digital assistant, and a minicomputer. System 600 includes integrated circuit (IC) 602 which may comprise a microprocessor. IC 602 may communicate with memory 604 via chipset 606. Memory 604 may comprise any type of memory for storing data, such as a Single Data Rate Random Access Memory, a Double Data Rate Random Access Memory, or a Programmable Read Only Memory. Graphics controller 608 and Network Interface Controller (NIC) 610 may also communicate with integrated circuit 602 via chipset 606. Graphics controller 608 may provide image signals to display 500, which operates as described above to display images based on the image signals.

A display according to some embodiments may be used in many other types of systems. Examples of such systems include any direct view or projection type displays (e.g. projection television, front projector).

The several embodiments described herein are solely for the purpose of illustration. Embodiments may include any currently or hereafter-known versions of the elements described herein. Therefore, persons skilled in the art will recognize from this description that other embodiments may be practiced with various modifications and alterations.

What is claimed is:

1. A device comprising:
 a first material associated with a controllable refractive index;
 a second material associated with a first refractive index;
 a third material disposed between the first material and the second material, the third material being substantially transparent to a plurality of visible light wavelengths and being associated with a second refractive index greater than the first refractive index; and
 a light source to output light into the third material at an angle based on the first refractive index and the second refractive index to result in reflection of the plurality of visible wavelengths through the first material and into a protective material.

2. A device according to claim 1, the light source to output into the third material to result in reflection of the plurality of visible wavelengths at an angle to cause substantially total internal reflection of the light at a first interface between the second material and the third material.

3. A device according to claim 2, the angle to cause substantially total internal reflection of the light at a second interface between the first material and the third material in a case that the controllable refractive index is less than the second refractive index, and
 the angle to cause the light to pass through the second interface in a case that the controllable refractive index is nearly equal to or greater than the second refractive index.

4. A device according to claim 1, further comprising:
 a reflective material coupled to the third material,
 wherein the light can exit the third material only through a first interface between the second material and the third material.

5. A device according to claim 1, wherein the light source comprises a light-emitting diode.

6. A device according to claim 1, wherein the light source comprises a red light source, a green light source, and a blue light source.

7. A device according to claim 1, further comprising:
 a first substantially transparent electrode disposed between the first material and the third material; and
 a second substantially transparent electrode, the first material being disposed between the second electrode and the first electrode,
 wherein the controllable refractive index is controlled at least in part by a potential difference between the first electrode and the second electrode.

8. A device according to claim 7, further comprising:
 a transistor coupled to the first electrode, a control signal line, and an electrode voltage signal line,
 wherein the transistor is to selectively couple the electrode voltage signal line to the first electrode based on a control signal on the control signal line.

9. A device according to claim 8, wherein the transistor is disposed between the first electrode and the third material.

10. A device according to claim 8, wherein the first electrode is coupled to a passive addressing circuit.

11. A device according to claim 1, further comprising:
 a first substantially transparent electrode disposed between a first portion of the first material and the third material;
 a second substantially transparent electrode disposed between a second portion of the first material and the third material, and substantially electrically isolated from the first electrode;
 a third substantially transparent electrode, the first material being disposed between the third electrode and the first and second electrodes,
 wherein a refractive index of the first portion is controlled at least in part by a potential difference between the first electrode and the third electrode, and
 wherein a refractive index of the second portion is controlled at least in part by a potential difference between the second electrode and the third electrode.

12. A device according to claim 11, further comprising:
 a first microlens, the third electrode disposed between the first electrode and the first microlens; and
 a second microlens, the third electrode disposed between the second electrode and the second microlens.

13. A device according to claim 1, further comprising:
 a first substantially transparent electrode disposed between the first material and the third material;
 a second substantially transparent electrode, a first portion of the first material disposed between the second electrode and the first electrode;
 a third substantially transparent electrode, a second portion of the first material disposed between the third electrode and the first electrode, and substantially electrically isolated from the second electrode,
 wherein a refractive index of the first portion is controlled at least in part by a potential difference between the first electrode and the second electrode, and
 wherein a refractive index of the second portion is controlled at least in part by a potential difference between the first electrode and the third electrode.

14. A device according to claim 13, further comprising:
 a first microlens, the third electrode disposed between the first electrode and the first microlens; and
 a second microlens, the second electrode disposed between the first electrode and the second microlens.

15. A device according to claim 1, wherein the light source is to output light into the third material at an angle less than $\sin^{-1}$ (the first refractive index/the second refractive index) to result in reflection of the plurality of visible wavelengths through the first material and into the protective material.

16. A device according to claim 1, wherein the light source is to output light into the third material at an angle greater than $\sin^{-1}$ (the first refractive index/the second refractive index) to prevent reflection of the plurality of visible wavelengths through the first material and into the protective material.

17. A device according to claim 1, wherein the controllable refractive index is less than the second refractive index, and wherein the light source is to output light into the third material at an angle greater than $\sin^{-1}$ (the controllable refractive index/the second refractive index) to prevent reflection of the plurality of visible wavelengths through the first material and into the protective material.

18. A device according to claim 1, wherein the controllable refractive index is greater than the second refractive index, and wherein the light source is to output light into the third material at an angle greater than $\sin^{-1}$ (the controllable refractive index/the second refractive index) to allow reflection of the plurality of visible wavelengths through the first material and into the protective material.

19. A device according to claim 1, wherein the controllable refractive index is greater than the second refractive index, and wherein the light source is to output light into the third material at an angle less than $\sin^{-1}$ (the controllable refractive index/the second refractive index) to allow reflection of the plurality of visible wavelengths through the first material and into the protective material.

* * * * *